United States Patent Office 3,489,729
Patented Jan. 13, 1970

3,489,729
POLYMERIZATION PROCESS FOR MAKING
VULCANIZABLE RUBBERY POLYMER
Gerald R. Kahle and Ollie G. Buck, Bartlesville, Okla.,
assignors to Phillips Petroleum Company, a corporation of Delaware
No Drawing. Filed Sept. 8, 1964, Ser. No. 395,027
Int. Cl. C08f $15/40$
U.S. Cl. 260—80.78                             14 Claims

ABSTRACT OF THE DISCLOSURE

Vulcanizable rubbery polymer is made by copolymerizing ethylene, a higher olefin such as propylene, and a monomer capable of rendering the resulting polymers sulfur vulcanizable; using a catalyst formed from a trihydrocarbylaluminum compound, an organic vanadium-containing compound, and halogen or a halogen-containing compound.

---

This invention relates to polymers, catalysts for making same, and methods for making the polymers and catalysts.

Many types of catalyst systems have been employed for the polymerization of ethylene and the copolymerization of ethylene with higher 1-olefins together with materials capable of introducing unsaturation into the polymer molecule. The products vary from crystalline to amorphous depending upon the catalyst system and the monomers. Heretofore if a third monomer, such as dicyclopentadiene or other compound capable of introducing unsaturation into the polymer molecule, was introduced along with the ethylene and higher 1-olefin, very little, if any, polymer was formed in the presence of the organoaluminum-trialkyl orthovanadate catalyst systems.

Accordingly, it is an object of this invention to produce a rubbery 1-olefin terpolymer of ethylene, a 1-olefin having 3 or more carbon atoms and a third monomer. It is another object of this invention to provide a new and improved method for producing a rubbery 1-olefin terpolymer. It is another object of this invention to provide a novel catalyst system effective for the production of rubbery terpolymers.

Other aspects, objects and the several advantages of the invention will be apparent to those skilled in the art from the following description and the appended claims.

It has been found that a rubbery 1-olefin terpolymer can be prepared in the presence of an organoaluminum-vanadium catalyst system if a certain active halogen-containing component or components are present in that system. More specifically, it has been found that elastomeric or amorphous terpolymers of ethylene, a higher 1-olefin, and a termonomer capable of introducing unsaturation into the resulting polymer molecule and rendering it sulfur vulcanizable can be produced by polymerization of said monomers in the presence of a catalyst system formed by mixing an organoaluminum compound, an organic orthovanadate or vanadyl acetylacetonate, and a selected active halogen-containing component. Not only is the catalyst system rendered active by addition of the selected halogen-containing component, but the molecular weight of the polymer can be regulated to some extent by controlling the amount of this catalyst ingredient. In a series of runs using the same charging procedure and carried out under identical conditions, an increase in the quantity of halogen-containing component generally causes a reduction in molecular weight of the polymer, as evidenced by inherent viscosity measurements.

Still more specifically, vulcanizable amorphous terpolymers are prepared by the copolymerization of ethylene, a higher 1-olefin, and a termonomer capable of introducing unsaturation into the polymer molecule in the presence of a catalyst formed by mixing (1) an organoaluminum compound; (2) at least one compound selected from the group consisting of organic orthovanadates and vanadyl acetylacetonates; and (3) at least one active halogen-containing component selected from the group consisting of (a) elemental halogen, (b) hydrogen halides, (c) tertiary haloalkanes and aryl-substituted derivatives thereof, (d) allyl-type halides, (e) aryl-substituted halomethanes, and (f) organic and inorganic metal halides of a metal selected from the group consisting of silicon, germanium, tin and lead wherein the halogen in (a), (b), (c), (d), (e) and (f) is at least one element selected from the group consisting of chlorine, bromine and iodine, Whenever the terms halogen, halogenated and the like appear hereinafter, only chlorine, bromine and iodine are meant to be included unless otherwise specified.

Organoaluminum compounds employed in the catalyst systems of this invention can be represented by the formula $R_3Al$, where R is at least one hydrocarbon radical selected from the group consisting of saturated acyclic, saturated cyclic, and aromatic radicals containing from 1 to 20 carbon atoms. Preferably, R comprises saturated acyclic radicals having from 1 to 6 carbon atoms per molecule. Organoaluminum compounds that can be employed include trimethylaluminum, triethylaluminum, tri-n-propylaluminum, triisopropylaluminum, triisobutylaluminum, tri-tert-butylaluminum tri-n-hexylaluminum, tridecylaluminum, tri(pentadecyl)aluminum, trieicosylaluminum, ethyldiisopropylaluminum, methyldinonylaluminum, tricyclopentylaluminum, tricyclohexylaluminum, tri(4-methylcyclohexyl)aluminum, dimethylcyclopentylaluminum, tri(2,4,6-tri-n-propylcyclohexyl)aluminum, triphenylaluminum, n-butyldiphenylaluminum, tri(4-isopropylphenyl)aluminum, tri-1-naphthylaluminum, tri-2-naphthylaluminum, tri(2,3,6,7-tetramethyl-1-naphthyl)aluminum, diethyl(4,5-di-n-amyl-1-naphthyl)aluminum, tribenzylaluminum, tri(cyclohexylmethyl)aluminum, tri(10-phenyldecyl)aluminum, tri(4-tolyl)aluminum, tri(2,4,6-trimethylphenyl)aluminum, tri(3-phenylcyclopentyl)aluminum, tri(4-cyclohexylphenyl)aluminum, and the like.

The vanadium compounds which can be utilized are the trialkyl esters of orthovanadic acid, more frequently referred to as organic orthovanadates, and vanadyl acetylacetonates. These compounds can be represented by the formula $VOY_n$ where Y is at least one material selected from the group consisting of alkoxy, cycloalkoxy, aryloxy, and acetylacetonate groups, each of said alkoxy, cycloalkoxy and aryloxy groups containing from 1 to 20 carbon atoms, $n$ equals 3 when Y is alkoxy, cycloalkoxy or aryloxy, and $n$ equals 2 or 3 when Y is an acetylacetonate group. Preferably, the vanadium compounds are trialkyl orthovanadates wherein each alkyl group has from 1 to 6 carbon atoms. Examples of these vanadium compounds include the following: trimethyl orthovanadate, triethyl orthovanadate, triisopropyl orthovanadate, tri-n-butyl orthovanadate, tri-tert-butyl orthovanadate, tri-n-decyl orthovanadate, trieicosyl orthovanadate, tricyclohexyl orthovanadate, dimethylcyclohexyl orthovanadate, dihexylpentadecyl orthovanadate, ethyldieicosyl orthovanadate, tri(2,4,6-tri-n-butylcyclohexyl) orthovanadate, tri(cyclohexylmethyl) orthovanadate, triphenyl orthovanadate, tri(3,5-di-n-heptylphenyl) orthovanadate, tribenzyl orthovanadate, n-hexyldibenzyl orthovanadate, dimethyl(4-phenylcyclohexyl) orthovanadate, diisopropyl (3-cyclopentylphenyl) orthovanadate, vanadyl diacetylacetonate, vanadyl triacetylacetonate, and the like.

The halogen-containing components required to render the catalyst system active for production of the rubbery 1-olefin terpolymers of this invention are of several types. Elemental chlorine, bromine and iodine, or mixtures thereof, and hydrogen chloride, hydrogen bromide and hydrogen iodide, or mixtures thereof, can be employed as well as certain types of halogen-containing compounds hereinbefore specified. Tertiary haloalkanes and aryl-substituted derivatives thereof include the following: tert-butyl chloride, tert-butyl bromide, tert-butyl iodide, tert-amyl bromide, 2,3-dimethyl-2-iodobutane, 4-n-propyl-4-bromoheptane, 3,8-diethyl-3,8-dichlorodecane, 3-phenyl-3-bromopentane, 7-n-hexyl-7-iodotetradecane, 3-cyclohexyl-3-bromoheptane, and 3,6-diphenyl-3,6-dichlorooctane. Preferred are tertiary haloalkanes having from 4 to 6 carbon atoms per molecule. Allyl-type mono- or di-halides, i.e. unsaturated mono- or di-halogenated alkenes containing from 3 to 12 and preferably from 3 to 6 carbon atoms per molecule wherein at least one halogen is attached to a carbon atom which is alpha to a doubly bonded carbon atom, include allyl chloride, allyl bromide, allyl iodide, 3-bromo-1-butene, 1,4-dichloro-2-butene, 1,4-diiodo-2-butene, 1-chloro-2-octene, 5,8-dibromo-6-dodecene, and 2,5-diiodo-3-hexene. Aryl-substituted monohalomethanes include benzyl chloride, benzyl bromide, 1-bromomethylnaphthalene, 2-iodomethyl-naphthalene, diphenylchloromethane, triphenylchloromethane, methylphenylbromomethane, 4-tolyliodomethane, 2,4,6-tri-n-butylphenylchloromethane, 3,5-di-n-heptylphenylchloromethane, methyl-1-naphthylbromomethane, and phenyl-2-naphthylchloromethane. Preferred are benzyl mono-halides. The foregoing halogen-substituted organic compounds generally contain from 4 to 20 carbon atoms per molecule.

The organic and inorganic metal halides can be represented by the formula $R_nMX_m$ where R is a saturated acyclic, saturated cyclic, or aromatic radical containing from 1 to 20 carbon atoms, M is selected from the group consisting of silicon, germanium, tin and lead, $n$ is an integer from 0 to 3, $m$ is an integer from 1 to 4, and the sum of $n+m$ equals 4. Preferred are dihalodiphenyl compounds of silicon, germanium, tin and lead. Illustrative of compounds of this type are the following: stannic chloride, stannic bromide, stannic iodide, germanium tetrachloride, germanium tetrabromide, silicon tetrachloride, silicon tetraiodide, lead tetrachloride, chlorotrimethylsilane, dichlorodiethylsilane, trichloromethylsilane, dichlorodi-n-hexylsilane, diiododi-tert-butylsilane, dibromodidodecylsilane, iodotrieicosylsilane, dichlorodicyclohexylsilane, trichlorobenzylsilane, dibromodiphenylsilane, dibromodimethylgermane, dichlorodi-n-hexylgermane, triiodophenylgermane, chlorotri(4-methylcyclohexyl)germane, chlorodimethyleicosylgermane, dibromodibenzylgermane, diiodomethyl-n-octylgermane, dichlorodi-n-butyltin, bromotribenzyltin, trichloro-4-cyclohexylbutyltin, diiododicyclopentyltin, dichlorodimethyllead, chlorotri-n-heptyllead, triiodododecyllead, chlorotriphenyllead, dichlorodibenzyllead, and chlorotri(4-tolyl)lead. It is to be understood that one or more of these selected halogen-containing components can be present in the catalyst systems of the invention.

Representative of the catalyst systems which can be used in this invention are the following: triisobutylaluminum, tributyl orthovanadate, and hydrogen chloride; triisobutylaluminum, tributyl orthovanadate, and chlorine; triisobutylaluminum, tributyl orthovanadate, and iodine; triisobutylaluminum, tributyl orthovanadate, and benzyl chloride; triisobutylaluminum, tributyl orthovanadate, and 1,4-diiodo-2-butene; triisobutylaluminum, tributyl orthovanadate, and tert-butyl bromide; triisobutylaluminum, tributyl orthovanadate, and tert-butyl chloride; trimethylaluminum, trimethyl orthovanadate, and benzyl chloride; tri-n-propylaluminum, trieicosyl orthovanadate, and tert-butyl chloride; tri-n-hexylaluminum, triphenyl orthovanadate, and allyl bromide; ethyldiisopropylaluminum, triethyl orthovanadate, and allyl chloride; methyldinonylaluminum, tribenzyl orthovanadate, and 3-bromo-1-butene; tricyclohexylaluminum, tri-n-butyl orthovanadate, and 1,4-dichloro-2-butene; dimethylcyclopentylaluminum, tri-tert-butyl orthovanadate, and diphenylchloromethane; triphenylaluminum, tri-n-decyl orthovanadate, and triphenylchloromethane; tri-n-butyldiphenylaluminum, vanadyl diacetylacetonate, and 1-bromomethylnaphthalene; tri-1-naphthylaluminum, vanadyl diacetylacetonate, and chlorine; tri-4-tolylaluminum, vanadyl triacetylacetonate, and hydrogen chloride; and tri-2-naphthylaluminum, vanadyl triacetylacetonate, and hydrogen bromide.

The mol ratio of organoaluminum compound to vanadium compound in the catalyst system can vary over a wide range but is preferably in the range of 3:1 to 20:1. The amount of active halogen-containing compound is generally based on the vanadium compound and is in the range of 1 to 30 mols per mol of the vanadium compound, but is preferably in the range of 2 to 25 mols per mol of the vanadium compound. The ratio of ethylene to 1-monoolefin employed can vary over a wide range depending on the physical properties desired in the final product. In the final composition, the amount of ethylene can vary between 20–75 weight percent, the higher 1-monoolefin can vary between 20–75 weight percent, and the termonomer is present in minor amounts, generally between 0.5–20 weight percent.

The polymerization reaction of this invention is conducted in the absence of oxygen, carbon dioxide, water and other materials which have a deleterious effect on the catalyst activity. The polymerizaiton reaction is conducted in the liquid phase utilizing a solvent, which will usually be a hydrocarbon or a halogenated hydrocarbon, such as propane, butane, pentane, hexane, benzene, toluene, xylene, tetrachloroethylene, cyclohexane, methylcyclohexane, chlorobenzene, o-dichlorobenzene, dichloromethane, 1,1,2,2-tetrachloroethane, and the like. The product polymer will be soluble or dispersed in the solvent and usually will be present in a concentration of 1 to 15 weight percent. The ploymerization conditions can vary widely, but generally the polymerization temperature will be in the range of $-100°$ to $200°$ F., preferably $-10°$ to $110°$ F., and the reaction pressure will be that sufficient to maintain the reaction mixture in the liquid phase and can be up to 500 or more atmospheres. The polymerization reaction can be conducted in a batch type operation or can be conducted in a continuous manner.

Following polymerization, the polymer product can be conventionally recovered from the effluent by coagulation with a nonsolvent such as an alcohol like isopropyl alcohol or n-butyl alcohol, acetone, or the polymer can be recovered by stripping the solvent with heat or steam. An antioxidant can be incorporated in the polymer during the recovery procedure, such as phenyl-beta-naphthylamine, di-tert-butylhydroquinone, triphenyl phosphite, heptylated diphenylamine, 2,2'-methylene-bis(4-methyl-6-tert-butylphenol, and 2,2,4,-trimethyl-6-phenyl-1,2-dihydroquinoline.

The vulcanization or curing of the novel polymers of this invention can be conducted using conventional sulfur vulcanization procedures. The quantity of sulfur employed will generally be about 0.1 to 5 parts by weight per 100 parts of polymer (phr.) and generally about 0.5 to 3 phr. Vulcanization can be effected, for example, at temperatures of 250 to 400° F. for 5 to 120 minutes.

Peroxides, for example 0.1 to 10 phr., can be utilized for vulcanization, representative peroxides being bis(alpha, alpha-dimethylbenzyl)peroxide, diisopropyl peroxide, di-tert-butyl peroxide, dibenzoyl peroxide, alpha,alpha-dimethylbenzyl hydroperoxide, tert-butyl perbenzoate, etc. Vulcanization accelerators, accelerator activators, reinforcing agents, extenders, plasticizers, antioxidants and fillers, like those agents employed in compounding natural and synthetic rubber, can also be employed. Fillers and reinforcing agents such as carbon black, clay, calcium silicate, talc, silica, whiting and titanium dioxide, and plasticizers such as naphthenic and paraffinic oils can be utilized in compounding of the polymers of this invention. Such polymers will have molecular weights in the range of about 5,000 to 1,000,000 and can be used in fabricating such rubber goods as coatings for electrical cables, window seals, garden hose, soles and heels, belts, coated fabrics, tires, and the like.

When operating in accordance with the present process, the polymers obtained are amorphous. The higher 1-monoolefins applicable as comonomers with ethylene are those containing from 3 to 8 carbon atoms per molecule, preferably those containing from 3 to 5 carbon atoms per molecule. Examples of these are: propylene, 1-butene, 1-pentene, 1-hexene, 1-octene, 3-methyl-1-butene, 3-methyl-1-pentene, 3-methyl-1-hexene, 4-ethyl-1-hexene, 4,4-dimethyl-1-pentene, 3,3-dimethyl-1-butene, 4-methyl-1-hexane, 4-methyl-1-heptene, 5-methyl-1-heptene, 4,4-dimethyl-1-hexene, 6-methyl-1-heptene, 3,4,4-trimethyl-1-pentene, and the like, including mixtures of two, three or more thereof.

Termonomers utilized to impart sulfur vulcanizability to the polymer include cyclic and acyclic, nonconjugated dienes having from 5 to 12 carbon atoms per molecule, for example dicyclopentadiene, 1,4-pentadiene, 1,5-hexadiene, 2-methyl-1,5-hexadiene, 3,3-dimethyl-1,5-hexadiene, 1,7-octadiene, 1,9-decadiene, ethynyl ethylenes such as vinylacetylene and isopropenylacetylene, and certain of the fulvene class of compounds such as 6,6-dimethylfulvene,
6,6-diethylfulvene,
6,6-di-n-butylfulvene,
6-tert-butylfulvene,
6-(2-butenyl)fulvene,
6,6-di(3-butenyl)fulvene,
6,6-dicyclobutylfulvene,
6,6-tetramethylenefulvene,
6,6-(2-butenylene)fulvene,
6-methyl-6-ethylfulvene,
1,2,6,6-tetramethylfulvene,
1,2,6,6-tetraethylfulvene,
1,2-di-n-butylfulvene,
1,2-dimethyl-6,6-diisopropylfulvene,
1,6-dimethyl-2-cyclobutylfulvene,
1,6,6-trimethyl-2(2-propenyl)fulvene,
6-phenylfulvene,
6-methyl-6-phenylfulvene, and
6,6-dibenzylfulvene, and the like, including mixtures thereof.

The following examples are presented further to illustrate the invention, although it is not intended that the invention should be limited thereto.

EXAMPLE I

A series of runs was made for the preparation of terpolymers is ethylene, propylene and dicyclopentadiene in the presence of a catalyst formed on mixing triisobutylaluminum, tributyl orthovanadate [$VO(OC_4H_9)_3$], and an active halogen-containing component. The following recipe was used:

| | |
|---|---|
| Tolene _____ ml__ | 100 |
| Triisobutylaluminum _____ mmoles__ | 1.0 |
| Tributyl orthovanadate _____ do____ | 0.1 |
| Halogen-containing component _____ do____ | Variable |
| Dicyclopentadiene _____ do____ | 2.5 |
| Ethylene/propylene mixture, ⅓ volume, p.s.i.g. over reactor pressure _____ | 45 |

A ⅓ volume mixture of ethylene/propylene was prepared by charging propylene to an evacuated bomb until the pressure reached 30 p.s.i.g. Ethylene was then introduced until the total pressure was 45 p.s.i.g.

In all runs toluene was charged first after which the reactor was purged with nitrogen. In Run 1, the tributyl orthovanadate was charged next and then the hydrogen chloride gas and dicyclopentadiene. The ethylene/propylene mixture was introduced over a five-minute period while the mixture was agitated after which polymerization was initiated by introduction of the triisobutylaluminum. In Runs 2–5 and 7–16, triisobutylaluminum was added followed by the active halogen-containing component, dicyclopentadiene, the ethylene/propylene mixture, and the tributyl orthovanadate. In Run 6, the charging order was dicyclopentadiene, triisobutylaluminum, ethylene/propylene mixture, tributylorthovanadate, and iodine. In all runs the ethylene/propylene mixture was introduced over a five-minute period during which time the reactor contents were agitated. Charging was done at room temperature. The reactor was open to the ethylene/propylene reservoir so that as polymerization continued, additional monomer mixture was supplied to the system. The temperature increased during polymerization since the reaction is exothermic.

After a 30-minute period each reaction was terminated with an isopropyl alcohol solution of 2,2'-methylene-bis (4-methyl-6-tert-butylphenol), the amount of this antioxidant used being one part by weight per 100 weight parts of polymer. The polymers were then coagulated in isopropyl alcohol, separated and dried. The products were all elastomeric. A summary of the runs is provided in Table I.

TABLE I

| Run No. | Halogen-Containing Component Type | Mmoles | Halogen Component/ $VO(OBu)_3$, Mole Ratio | Polymer Weight, Grams | Unsaturation, Mmoles ICl/g. Polymer | Propylene, Weight percent | Inherent Viscosity | Toluene Insolubles, Weight percent |
|---|---|---|---|---|---|---|---|---|
| 1 | HCl, gas | 2.0 | 20/1 | 2.3 | 0.46 | 46 | 0.89 | 0 |
| 2 | HCl, gas | 1.5 | 15/1 | 2.5 | 0.27 | 43 | 0.75 | 0 |
| 3 | HCl, gas | 1.0 | 10/1 | 1.4 | 0.58 | 29 | 1.12 | 42 |
| 4 | Cl₂, gas | 2.0 | 20/1 | 2.4 | 0.02 | 56 | 0.94 | 0 |
| 5 | I₂ | 2.0 | 20/1 | 0.16 | | | | |
| 6 | I₂ | 1.5 | 15/1 | 0.41 | | | 0.37 | 45 |
| 7 | I₂ | 1.0 | 10/1 | 0.21 | | | | |
| 8 | Benzyl Chloride | 2.0 | 20/1 | 2.4 | 0.11 | 45 | 0.79 | 0 |
| 9 | do | 1.0 | 10/1 | 1.2 | 0.45 | | 1.76 | 46 |
| 10 | do | 0.5 | 5/1 | 0.2 | | | | |
| 11 | 1,4-dioido-2-butene | 1.0 | 10/1 | 1.3 | 0.33 | 56 | 2.17 | 37 |
| 12 | t-Butyl bromide | 2.0 | 20/1 | 2.0 | 0.44 | 37 | 0.54 | 22 |
| 13 | do | 1.0 | 10/1 | 1.4 | 0.30 | | 0.70 | 20 |
| 14 | t-Butyl chloride | 2.0 | 20/1 | 2.8 | 0.05 | 48 | 0.73 | 23 |
| 15 | do | 1.0 | 10/1 | 2.5 | 0.29 | | 0.97 | 31 |
| Control (16) | | | | 0 | | | | |

In all cases where an active halogen-component was employed, rubbery products were obtained. Runs carried out in the absence of an active halogen-containing component gave no polymer.

EXAMPLE II

Terpolymers of ethylene, propylene, and dicyclopentadiene were prepared in a series of runs in the presence of a catalyst formed on mixing triisobutylaluminum, tributyl orthovanadate, and benzyl chloride. Polymerizations were carried out in a two-liter reactor. The recipe was as follows:

| | |
|---|---|
| Toluene _____ml__ | 1000 |
| Triisobutylaluminium _____mmoles__ | 10 |
| Tributyl orthovanadate _____do____ | 1.0 |
| Benzyl chloride _____do____ | Variable |
| Dicyclopentadiene _____do____ | 40 |
| Ethylene feed rate _____ml./min__ | 500 |
| Propylene feed rate _____ml./min__ | 1500 |

Polymerizations were carried out in a two-liter reactor which, together with associated equipment, was dried at 110° C. for a minimum of two hours. The reactor equipment was assembled while hot and cooled by passing nitrogen gas through it. Toluene was introduced and the nitrogen flow was continued for five minutes. In Run 1, the toluene was cooled to 0° C., nitrogen gas flow was discontinued and ethylene and propylene were metered through calibrated flow meters and introduced below the surface of the toluene through a common dispersion tube. About 30 minutes was allowed to saturate the diluent with the gaseous monomers. Dicyclopentadiene was charged by syringe through a rubber seal in the top of the reactor. An appropriately placed mineral oil seal was provided for escape of undissolved and unreacted ethylene and propylene. Triisobutylaluminum was introduced by syringe followed by benzyl chloride and finally tributyl orthovanadate. In Runs 2 through 8, triisobutylaluminum was charged to the toluene and then benzyl chloride. The mixture was stirred two minutes at room temperature and then cooled to 0° C. after which ethylene and propylene were added as in Run 1. Dicyclopentadiene was then introduced and finally the tributyl orthovanadate. In all runs the monomer feed was maintained throughout the reaction period at the rate indicated in the recipe. Polymerizations were terminated and products recovered as in Example I. All produces were rubber. A summary of the runs is presented in Table II.

The blends were prepared on the mill and each composition compounded at two carbon black and oil levels. Compounding recipes, compounded Mooney (MS-4 at 212° F.), and properties of cured stocks are presented in Table III.

TABLE III
Compounding Recipes, Parts by Weight

| | 1 | 2 | 3 | 4 |
|---|---|---|---|---|
| Blend A | 100 | 100 | | |
| Blend B | | | 100 | 100 |
| High abrasion furnace black | 50 | 100 | 50 | 100 |
| Zinc oxide | 5 | 5 | 5 | 5 |
| Stearic acid | 1 | 1 | 1 | 1 |
| Circosol 2 XH [1] | 30 | 80 | 30 | 80 |
| Sulfur | 1.5 | 1.5 | 1.5 | 1.5 |
| Captax [2] | 0.5 | 0.5 | 0.5 | 0.5 |
| Monex [3] | 1.5 | 1.5 | 1.5 | 1.5 |
| Compounded MS-4 at 212° F | 97.0 | 74.0 | 88.5 | 84.0 |
| Cured 30 Minutes at 320° F. | | | | |
| 100% Modulus, p.s.i.[4] | 830 | 690 | 820 | 880 |
| 200% Modulus, p.s.i.[4] | | 1,880 | 2,570 | 2,570 |
| Tensile, p.s.i.[4] | 2,190 | 1,970 | 2,570 | 2,570 |
| Elongation, percent [4] | 175 | 205 | 200 | 200 |
| ΔT, ° F.[5] | 41.9 | 57.1 | 42.7 | 54.8 |
| Resilience, percent [6] | 75.5 | 64.2 | 77.3 | 66.2 |
| Shore A Hardness [7] | 72.0 | 72.5 | 74.5 | 74.5 |
| Gehman freeze point, ° C.[8] | −45 | −46 | −46 | −46 |

[1] Petroleum hydrocarbon softener containing hydrocarbons of high molecular weight in the form of a heavy, viscous, transparent, pale green, odorless liquid of low volatility; sp. gr. 0.940; Saybolt Universal viscosity at 100° F., about 2,000 seconds.
[2] 2-mercaptobenzothiazole.
[3] Tetramethylthiuram monosulfide.
[4] ASTM D-412-61T.
[5] ASTM D-623-58. Method A, Goodrich Flexometer, 143 lb./sq. in. load, 0.175-inch stroke. Test specimen is a right circular cylinder 0.7 inch in diameter and one inch high.
[6] ASTM D-945-59 (modified). Yerzley oscillograph. Test specimen is a right circular cylinder 0.7 inch in diameter and one inch high.
[7] ASTM D-676-59T. Shore Durometer, Type A.
[8] ASTM D-1053-61 (modified). Gehman torsional apparatus. Test specimens are 1.625 inches long, 0.125 inch wide, and 0.077 inch thick. The angle of twist is measured at 5° C. intervals. Extrapolation to zero twist gives the freeze point.

These data show that all products were elastomers.

EXAMPLE III

A series of runs was made for the preparation of terpolymers of ethylene, propylene and dicyclopentadiene in the presence of a catalyst formed on mixing triisobutylaluminum, tributyl orthovanadate, and dichlorodiphenyl-

TABLE II

| Run No. | Benzyl Cl, Mmoles | Benzyl Cl/ VO(O Bu)₃ Mole Ratio | Polymer Weight Grams | Unsaturation, Mmoles ICl/ g. Polymer | Propylene, Weight Percent | Inherent Viscosity | Toluene Insolubles Weight Percent |
|---|---|---|---|---|---|---|---|
| 1 | 20.0 | 20/1 | 12.2 | 0.80 | | 2.61 | |
| 2 | 12.5 | 12.5/1 | 16.5 | 0.30 | 42 | 2.22 | 0 |
| 3 | 12.5 | 12.5/1 | 22.4 | 0.73 | 45 | 2.7 | 0 |
| 4 | 12.5 | 12.5/1 | 22.4 | 0.71 | 46 | 2.5 | 0 |
| 5 | 10.0 | 10/1 | 19.1 | 0.49 | 36 | 3.30 | 0 |
| 6 | 10.0 | 10/1 | 19.3 | 0.42 | 37 | 4.14 | 0 |
| 7 | 12.5 | 12.5/1 | 24.3 | 0.72 | 42 | 3.1 | 0 |
| 8 | 12.5 | 12.5/1 | 18.4 | 0.73 | | 3.8 | 14 |

Two blends were prepared, one from products from Runs 1–4 and the other from products from Runs 5–8. Amounts of materials in each blend expressed as weight per cent, were as follows:

| Product From Run: | Blend A | Blend B |
|---|---|---|
| 1 | 15.6 | |
| 2 | 21.8 | |
| 3 | 31.3 | |
| 4 | 31.3 | |
| 5 | | 23.6 |
| 6 | | 23.6 |
| 7 | | 30.5 |
| 8 | | 22.3 | tin. The recipe was the same as in Example I and a ⅓ volume mixture of ethylene/propylene was prepared in the manner described in that example Toluene was charged first after which the reactor was purged with nitrogen. Triisobutylaluminum was charged and then the dichlorodiphenyltin. The ethylene/propylene mixture was introduced over a 5-minute period while the mixture was agitated. Polymerization was then initiated by introduction of the tributyl orthovanadate. Additional 1-olefin monomers were supplied to the system by having the reactor open to the ethylene/propylene reservoir. Except for the order of charging of the several materials, the procedure was the same as described in Example I. The products were elastomers. Results are summarized in the following table:

|  | 1 | 2 | 3 |
|---|---|---|---|
| Dichlorodiphenyltin, mmols | 2 | 1 | 0.5 |
| $\phi_2SnCl_2/VO(OC_4H_9)_3$, mol ratio | 20/1 | 10/1 | 5/1 |
| Polymer wt., grams | 1.5 | 1.5 | 2.1 |
| Unsaturation, mmols, ICl/g. polymer | 0.42 |  | 0.54 |
| Propylene, wt. percent |  | 35 |  |
| Inherent viscosity | 0.74 | 0.40 | 1.32 |
| Toluene insolubles, wt. percent | 32 | 22 | 29 |

Reasonable variations and modifications of this invention can be made, or followed, in view of the foregoing, without departing from the spirit or scope thereof.

We claim:

1. A method of making a vulcanizable rubbery polymer comprising reacting under polymerization conditions ethylene, at least one higher 1-olefin and a monomer capable of rendering the resulting polymer sulfur vulcanizable, carrying out said reaction in the presence of an organoaluminum-vanadium catalyst resulting from mixing (1) an organoaluminum compound represented by the formula $R_3Al$ wherein R is at least one hydrocarbon radical selected from the group consisting of saturated acyclic, saturated cyclic and aromatic radicals containing from 1 to 20 carbon atoms, (2) at least one vanadium compound represented by the formula $VOY_n$ wherein Y is at least one material selected from alkoxy, cycloalkoxy, aryloxy, and acetylacetonate groups, each of said groups containing from 1 to 20 carbon atoms, and $n$ is the integer 2 or 3, and (3) at least one active halogen-containing component selected from the group consisting of (a) elemental halogen, (b) hydrogen halides, (c) tertiary haloalkanes and aryl-substituted derivatives thereof, (d) allyl-type mono- or di-halides, (e) aryl-substituted mono-halomethanes, and (f) organic and inorganic metal halides of a metal selected from the group consisting of silicon, germanium, tin, and lead wherein the halogen in (a), (b), (c), (d), (e) and (f) is at least one element selected from the group consisting of chlorine, bromine and iodine wherein the amount of halogen-containing compound based on vanadium compound is 1 to 30 mols per mol of vanadium compound.

2. The method of claim 1 wherein the amount of active halogen-containing component is in the range of about 1 to about 30 mols per mol of vanadium compound.

3. A method of making a sulfur vulcanizable rubbery polymer comprising reacting under polymerization conditions of −100 to 200° F. and a pressure sufficient to maintain the reaction mixture in the liquid phase ethylene and at least one higher 1-monoolefin having from 3 to 8 carbon atoms per molecule and a monomer capable of rendering the resulting polymer sulfur vulcanizable, carrying out said reaction in the presence of a catalyst comprising an organoaluminum compound represented by the formula $R_3Al$ where R is at least one hydrocarbon radical selected from the group consisting of saturated acyclic, saturated cyclic and aromatic radicals containing from 1 to 20 carbon atoms, a vanadium compound represented by the formula $VOY_n$ where Y is selected from the group consisting of alkoxy, cycloalkoxy, aryloxy and acetylacetonate groups, each of said alkoxy, cycloalkoxy and aryloxy groups containing from 1 to 20 carbon atoms, $n$ equals 3 when Y is alkoxy, cycloalkoxy or aryloxy, and $n$ equals 2 or 3 when Y is an acetylacetonate group, and an active halogen-containing component selected from at least one of the group consisting of (a) elemental halogen, (b) hydrogen halides, (c) tertiary haloalkanes and aryl-substituted derivatives thereof (d) allyl-type mono- or di-halides, (e) aryl-substituted mono-halomethanes, and (f) organic and inorganic metal halides of a metal selected from the group consisting of silicon, germanium, tin and lead wherein the halogen in (a), (b), (c), (d), (e) and (f) is selected from the group consisting of chlorine, bromine and iodine, the mol ratio of organoaluminum compound to vanadium compound is in the range of 3/1 to 20/1, the amount of active halogen-containing compound based on the vanadium compound is 1 to 30 mols per mol of the vanadium compound, and the amount of monomers employed is sufficient to provide a final composition having 20 to 75 weight percent ethylene, 20 to 75 weight percent higher 1-monoolefin, and 0.5 to 20 weight percent of the third monomer, said polymerization being conducted in the liquid phase utilizing a solvent selected from the group consisting of hydrocarbon and halogenated hydrocarbon.

4. A method of making a vulcanizable rubbery polymer comprising reacting under polymerization conditions ethylene and at least one higher 1-monoolefin having from 3 to 5 carbon atoms per molecule and a monomer capable of rendering the resulting polymer sulfur vulcanizable and which is selected from the group consisting of cyclic and acyclic non-conjugated dienes having from 5 to 12 carbon atoms per molecule, carrying out said reaction in the presence of a catalyst comprising an organoaluminum compound represented by the formula $R_3Al$ where R comprises saturated acyclic radicals having from 1 to 6 carbon atoms per molecule, a trialkyl orthovanadate wherein the alkyl radical has from 1 to 6 carbon atoms per molecule, and an active halogen-containing component selected from at least one of the group consisting of (a) elemental halogen, (b) hydrogen halide, (c) tertiary acyclic haloalkanes having from 4 to 6 carbon atoms per molecule, (d) unsaturated mono- or di-halogenated alkenes containing from 3 to 6 carbon atoms per molecule, (e) benzyl mono-halides, and (f) dihalodiphenyl compounds of at least one metal selected from the group consisting of silicon, germanium, tin and lead wherein the halogen in (a), (b), (c), (d), (e) and (f) is selected from the group consisting of chlorine, bromine and iodine wherein the amount of active halogen-containing compound based on vanadium compound is 1 to 30 mols per mol of vanadium compound.

5. A method of making a rubbery polymer comprising reacting under polymerization conditions ethylene, propylene and dicyclopentadiene in the presence of a mixture of triisobutylaluminum, tributyl orthovanadate and benzyl chloride wherein the amount of active halogen-containing compound based on vanadium compound is 1 to 30 mols per mol of vanadium compound.

6. A method of making a rubbery polymer comprising reacting under polymerization conditions ethylene, propylene and dicyclopentadiene in the presence of a mixture of triisobutylaluminum, tributyl orthovanadate and hydrogen chloride wherein the amount of active halogen-containing compound based on vanadium compound is 1 to 30 mols per mol of vanadium compound.

7. A method of making a vulcanizable rubbery polymer comprising reacting under polymerization conditions ethylene, propylene and dicyclopentadiene in the presence of a mixture of triisobutylaluminum, tributyl orthovanadate and chlorine wherein the amount of active halogen-containing compound based on vanadium compound is 1 to 30 mols per mol of vanadium compound.

8. A method of making a vulcanizable rubbery polymer comprising reacting under polymerization conditions ethylene, propylene and dicyclopentadiene in the presence of a mixture of triisobutylaluminum, tributyl orthovanadate and iodine wherein the amount of active halogen-containing compound based on vanadium compound is 1 to 30 mols per mol of vanadium compound.

9. A method of making a rubbery polymer comprising reacting under polymerization conditions ethylene, propylene and dicyclopentadiene in the presence of a mixture of triisobutylaluminum, tributyl orthovanadate and tert-butyl bromide wherein the amount of active halogen-containing compound based on vanadium compound is 1 to 30 mols per mol of vanadium compound.

10. A method of making a rubbery polymer comprising reacting under polymerization conditions ethylene, propylene and dicyclopentadiene in the presence of a mixture of triisobutylaluminum, tributyl orthovanadate and tert-butyl chloride wherein the amount of active halogen-containing compound based on vanadium compound is 1 to 30 mols per mol of vanadium compound.

11. A method of making a rubbery polymer comprising reacting under polymerization conditions ethylene, propylene and dicyclopentadiene in the presence of a mixture of triisobutylaluminum, tributyl orthovanadate and 1,4-diiodo-2-butene wherein the amount of active halogen-containing compound based on vanadium compound is 1 to 30 mols per mol of vanadium compound.

12. A method of making a rubbery polymer comprising reacting under polymerization conditions ethylene, propylene and dicyclopentadiene in the presence of a mixture of triisobutylaluminum, tributyl orthovanadate and dichlorophenyltin wherein the amount of active halogen-containing compound based on vanadium compound is 1 to 30 mols per mol of vanadium compound.

13. A method of making a catalyst comprising mixing under conditions that form said catalyst an organoaluminum compound represented by the formula $R_3Al$ wherein R is at least one hydrocarbon radical selected from the group consisting of saturated acyclic, saturated cyclic and aromatic radicals containing from 1 to 20 carbon atoms with a vanadium compound represented by the formula $VOY_n$ where Y is at least one material selected from the group consisting of alkoxy, cycloalkoxy, aryloxy and acetylacetonate groups, each of said alkoxy, cycloalkoxy and aryloxy groups containing from 1 to 20 carbon atoms, $n$ equals 3 when Y is alkoxy, cycloalkoxy or aryloxy, and $n$ equals 2 or 3 when Y is an acetylacetonate group; and an active halogen-containing component selected from at least one of the group consisting of (a) elemental halogen, (b) hydrogen halides, (c) tertiary haloalkanes and aryl-substituted derivatives thereof, (d) allyl-type halides, (e) aryl-substituted halomethanes, and (f) organic and inorganic metal halides wherein the halogen in (a), (b), (c), (d), (e) and (f) is selected from the group consisting of chlorine, bromine and iodine.

14. The method of claim 13 wherein said catalyst comprises triisobutylaluminum, tributyl orthovanadate and benzyl chloride.

References Cited

UNITED STATES PATENTS

| | | | |
|---|---|---|---|
| 3,301,834 | 1/1967 | Christman | 260—94.9 |
| 3,180,838 | 4/1965 | Durham | 252—431 |
| 3,301,833 | 1/1967 | Natta | 260—80.6 |
| 3,166,517 | 1/1965 | Ro | 260—80.5 |

FOREIGN PATENTS 632,635  11/1963  Belgium.

OTHER REFERENCES

Natta et al., J. Polymer Science, 51, 411–423 (1961). (QD 281. P6J6 in Scientific Library.)

JOSEPH L. SCHOFER, Primary Examiner

ROGER S. BENJAMIN, Assistant Examiner

U.S. Cl. X.R.

252—431